United States Patent Office

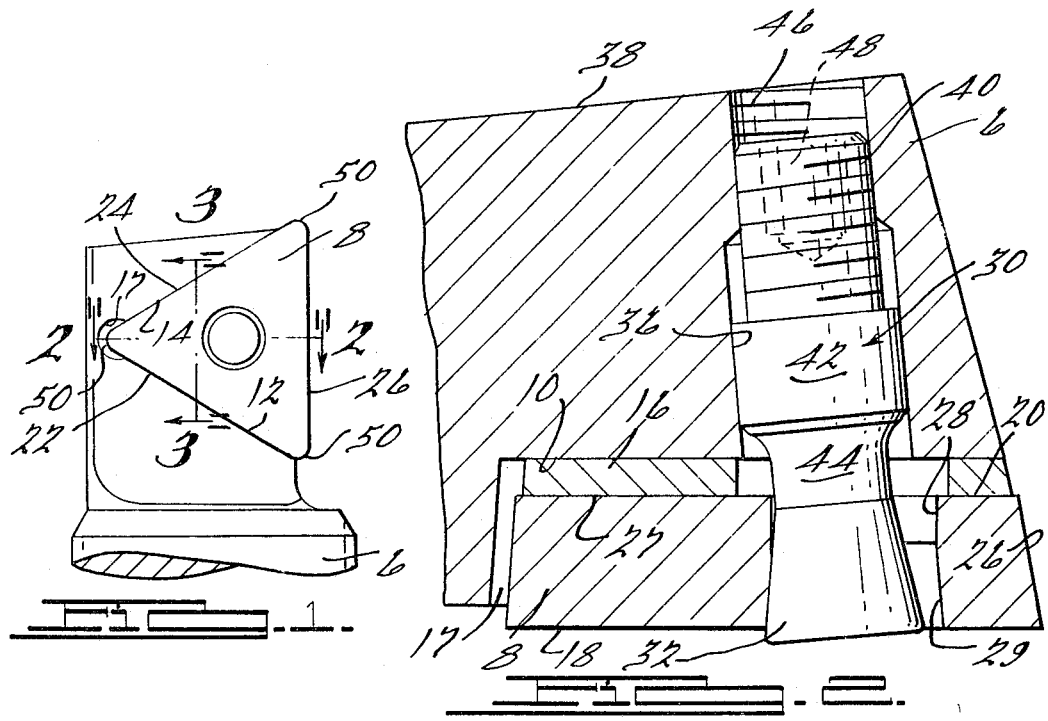
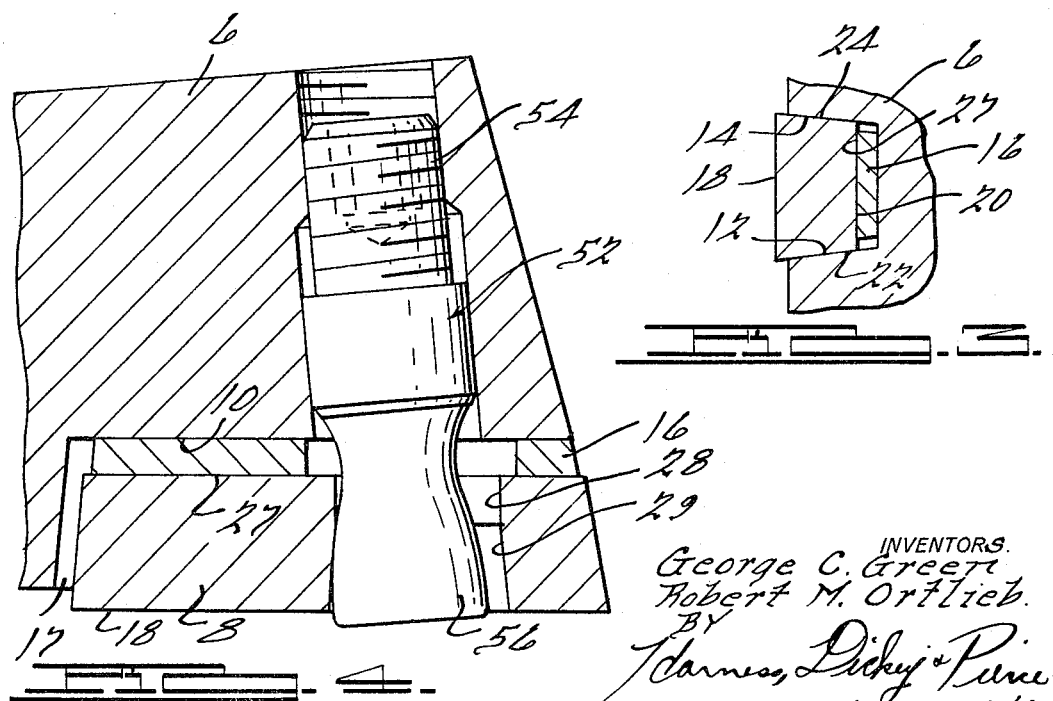

3,284,874
Patented Nov. 15, 1966

3,284,874
CUTTING TOOL WITH REMOVAL CUTTER ELEMENT
George C. Green, Royal Oak, and Robert M. Ortlieb, Southfield, Mich., assignors to De Vlieg Machine Company, Royal Oak, Mich., a corporation of Michigan
Filed Nov. 22, 1965, Ser. No. 509,037
5 Claims. (Cl. 29—96)

This invention relates to cutting tools and, particularly, to a metal cutting tool having a removable and indexible cutter element. This application is a continuation-in-part of our copending application, Serial No. 355,805 filed March 30, 1964 and now abandoned.

In the manufacture of metal cutting tools, it is frequently desired to utilize one material for the cutting edge or edges and another material for the remainder of the tool. For example, a piece of tungsten carbide is often provided at the tip of a single point cutting tool which is otherwise made from steel. The reason for this is that tungsten carbide is extremely hard and a cutting edge ground thereon will remain sharp for a comparatively long period of use. On the other hand, tungsten carbide is expensive, it is not readily machineable and it does not have many of the other desirable mechanical properties of steel. Therefore, the remaining portion of the tool, which supports and locates the tip, is ordinarily made from steel.

It has been customary to secure a cutter made from tungsten carbide or other hard material to a steel tool "body" by brazing. However, in recent years various cutting tools have been introduced commercially wherein the cutter is removably secured to the tool body by a clamp or the like. This has the advantage of permitting a dull cutter to be readily replaced by another sharp cutter or permitting the cutter to be indexed to present an unused sharp surface to the cutting position. The present invention pertains to this general category of cutting tools and it is a general object of the present invention to render such tools more efficient and reliable in use and of sturdy yet precise construction.

It is another object of the present invention to provide a tool of the above character which may be manufactured at a reasonable cost.

It is still another object of the present invention to provide a cutting tool of the above character which may be indexed to provide several unused cutting edges to the cutting position before the cutter must be reground.

It is yet another object of the present invention to provide a cutting tool of the above character in which the cutter is firmly held securely down against its seat on the tool body and in which the cutter is located on the tool body with great accuracy.

It is another object of the present invention to provide a cutting tool of the above character in which the cutter may be removed by the slight loosening of the parts which lock the cutter in position and in which such parts need not be disassembled from the tool body in order to remove the cutter.

These and other objects of the present invention will become apparent from the following detailed description, taken in conjunction with the accompanying drawings, wherein:

FIGURE 1 is a fragmentary plan view of a cutting tool embodying the principles of the present invention;

FIGURE 2 is a sectional view of the structure illustrated in FIGURE 1 taken along the line 2—2 thereof;

FIGURE 3 is an enlarged sectional view of the structure illustrated in FIGURE 1 taken along the line 3—3 thereof;

FIGURE 4 is a view of structure similarly illustrated in FIGURE 1, showing another form of the invention.

Referring now to the drawings, the invention is depicted in the form of a fragmentarily illustrated single point cutting tool having an elongated supporting body 6 which serves to support a cutter or cutting element 8 at its tip or free end. The opposite end of the tool body 6, while not illustrated, is provided with any suitable means by which the entire structure is held in a desired position. The body 6 is formed with a cutter receiving recess which is open on at least two sides and which is defined by a flat face or seat 10 and a pair of locating shoulders 12 and 14. The shoulders 12 and 14 converge toward one another in a plane parallel to the seat 10, as may be seen in FIGURE 1. However, the shoulders 12 and 14 diverge away from one another in a direction upwardly away from the seat 10, as can be seen in FIGURE 3. A shim 16 is desirably positioned between the cutter 8 and the seat 10 and is made from a relatively hard material to provide a suitable hard bearing surface for the cutter 8. The body 6 has a relieved area 17 adjacent the locus of convergence of the shoulders 12 and 14 which facilitates the grinding of these shoulders. It will be appreciated that the body 6 may assume a wide variety of configurations within the scope of the present invention; the overall shape of the body 6, apart from the immediate area of cutter 8, being of little relevance to the present invention.

While variously shaped cutters may be utilized, the cutter 8, illustrated herein, has something of the form of a triangularly shaped button or, stated more precisely, the form of a truncated pyramid of triangular cross section with rounded corners. The cutter 8 has spaced flat parallel top and bottom walls 18 and 20, respectively, which are interconnected by three upwardly diverging side walls 22, 24 and 26. An opening 28, having a conical portion 29 disposed with its axis perpendicular to the walls 18 and 20, is formed in the center of the cutter 8. The cutter 8 rests with its lower bottom wall 20 in conforming engagement with a flat upper face or seat 27 of the shim 16.

The cutter 8 is held against the face 27 of the shim 16 with its sides 24 and 26 in engagement with the shoulders 12 and 14 of the body 6 by means of a wedge member, generally indicated at 30. The wedge member 30 has a conical head portion 32 disposed within the opening portion 29 of the cutter 8 and engages the wall thereof. The major portion of the length of the wedge member 30 is disposed within a bore 36 formed within the body 6 and extending between the seat 10 thereof and an outer surface 38 on the opposite side of the body 6 from the seat 10. The wedge member 30 is generally pin shaped and is symmetrical about its longitudinal axis. A threaded portion 40 is formed at the end of the wedge member 30 opposite from the head 32. The wedge member 30 also has a cylindrical bearing or pilot portion 42 at its mid-length snugly but slidably fitted in the bore 36 and a reduced diameter portion 44 between the head portion 32 and the pilot portion 42. The body bore 36 is threaded as indicated at 46 for engagement with the threaded portion 40 of the wedge member 30. The threaded portion 40 of the wedge member 30 has a socket 48 of hexagonal cross section, for the reception of a so-called "Allen" wrench. The axis of the threaded bore portion 46 coincides with the longitudinal axis of the wedge member 30 and, thus, screwing and unscrewing the wedge member 30 in the threaded bore portion 46 adjusts the wedge member along its longitudinal axis.

As is readily apparent in FIGURE 3, the axis of the wedge member 30 is not parallel to the axis of the conical bore portion 29, but is inclined with respect to said axis. In the particular embodiment illustrated in FIGURES 1–4, the magnitude of this inclination is five (5°) degrees. Further, the axis of the wedge member 30 lies in an imaginary plane which bisects the angle between the shoulders 12 and 14 and is perpendicular to the seat 10. The surface of the wedge head 32 possesses an angle of the taper with respect to its axis which is greater than the angle of inclination of the wedge axis, which in this embodiment is ten (10°) degrees. The angle of taper of the opening portion 29 is equal to the wedge head 32 angle less the angle of inclination of the wedge axis, or five (5°) degrees. For this reason, the surface 34 will make line contact with the wall of the cutter opening 28. By advancing the wedge member 30 toward the large end of the opening portion 29 from the position in which it is shown in FIGURE 2, the wedge surface 34 will be moved sufficiently away from the wall of the opening to permit the cutter 8 to be removed from the tool body 6. It will be seen that the wedge head 32 is smaller than the smallest diameter of the opening 28 to permit such removal. The cutter 8 is simply lifted freely off of the shim 16 in a direction perpendicular its surface 20.

When the wedge member 30 is tightened to cause the wedge head 32 to bear against the wall of the opening portion 29, the wedge member 30 applies a force to the cutter 8 forcing it equally against the shoulders 12 and 14 and against the shim 16. The cutter 8 is thereby locked against movement relative to the body 6. It will be seen that the pilot portion 42 of the wedge member 30 holds the wedge member against deflection.

As will be readily apparent to those familiar with indexible cutters, the cutter 8 may be indexed to three different positions to utilize three different cutting radii 50 adjacent the surface 18. It is to be noted that the use of the present invention assures that the cutter will be held against its locating surfaces by a force which is applied to the cutter in the same place and in the same direction each time a cutter is secured in place, irrespective of the amount of tightening necessary. Therefore, the reliability of the tool in positioning a cutter is excellent.

It should be mentioned that because of the inclination of the walls 12, 14, 24, 26 from a plane normal to shim 16, the wall 24 and 26 apply forces to the cutter 8 tending to cause the cutter to be raised off the shim 16 and unless some means is provided for positively holding the cutter and shim 16 against the seat 10, this undesired movement will occur. This means is supplied by virtue of the tapering or conical configuration of the opening portion 29 and the use of a wedge head angle which is greater than the angle of inclination of the wedge axis. Incidentally, the exemplary angles mentioned for the head 32 and opening 28 are all given with respect to the related axes. The "included" angles for said conical surfaces would be twice the amount stated.

FIGURE 4 shows a slightly modified form of the invention in which the same tool body 6, shim 16 and cutter 8 are used. The only new part is a wedge 52 having a threaded portion 54 threaded into the body 6 as in the prior embodiment. The wedge 52 is different from the wedge 30 in the configuration of its head 56. Rather than having a conical head, the wedge head 56 has the shape of a frustum of an ellipsoid. In other words, the surface of the head 56 appears as a curve rather than a straight line in cross section. For this reason, the head 52 makes a theoretical point contact with the opening portion 29, rather than line contact. As a practical matter, contact is made over a limited area due to slight compression of the materials.

It will be noted that the curvature of the head 54 in the direction of the axis of the wedge 52 gives the head 56 a greater rate of taper than the opening portion 29. Thus, the axis of the wedge 52 may be inclined away from the intersection of the shoulders 12 and 14 (as it goes away from the seat 10), and it will engage the cutter 8 in its opening portion 29 to apply a force to the cutter which may be resolved by a component acting against the seat 10 and a component acting against the shoulders 12 and 14. This is, of course, true of the first embodiment of the invention as well. Both embodiments, therefore, positively seat the cutter 8 against the shim 16 and hold the cutter and shim against the seat 10.

In practice it may be somewhat difficult to establish the degree of inclination of the wedge 30 so that perfect line contact is achieved between the head 32 and the opening portion 29 in the embodiment of FIGURES 1–3, and it is possible that only limited area contact will be achieved. The embodiment of FIGURE 4 permits rather generous tolerances in establishing the axis of the wedge 52 but minimizes stress and wear conditions resulting from a theoretical point contact between the wedge and cutter.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims. For example, the specific angles mentioned herein are illustrative only, and a wide range of wedge angles can be used in carrying out the present invention.

What is claimed is:

1. A cutting tool including a supporting member having a flat seat and a pair of convergingly related shoulders adjacent to said seat; a cutter supported on said seat and having an opening portion of tapering diameter, and a locking wedge having a head of tapering diameter disposed in said opening portion, said locking wedge being threadably connected to said supporting member and being advanceable along a thread axis which is inclined with respect to a line perpendicular to said seat, said head having a rate of taper greater than the rate of taper of said opening and being engageable with the wall of said opening to bias said cutter against said seat and against said shoulders and positively secure said cutter in a fixed position on said supporting member.

2. The structure as set forth in claim 1 in which said opening portion has an axis disposed perpendicular to said seat.

3. The structure set forth in claim 1 in which the angle of taper of said head is equal to the sum of the angle of taper of said opening portion and the angle of inclination of said thread axis with respect to a line perpendicular to said seat.

4. The structure set forth in claim 1 in which said head and said opening portion are segmentally conical.

5. The structure set forth in claim 1 in which said opening portion is segmentally conical and said head is segmentally ellipsoidal.

References Cited by the Examiner

UNITED STATES PATENTS 3,173,191    3/1965    Alexander _____ 29—96

WILLIAM W. DYER, JR., *Primary Examiner.*

HARRISON L. HINSON, *Examiner.*